H. L. WELLS.
Improvement in Churn-Dashers.
No. 114,736.                              Patented May 9, 1871.
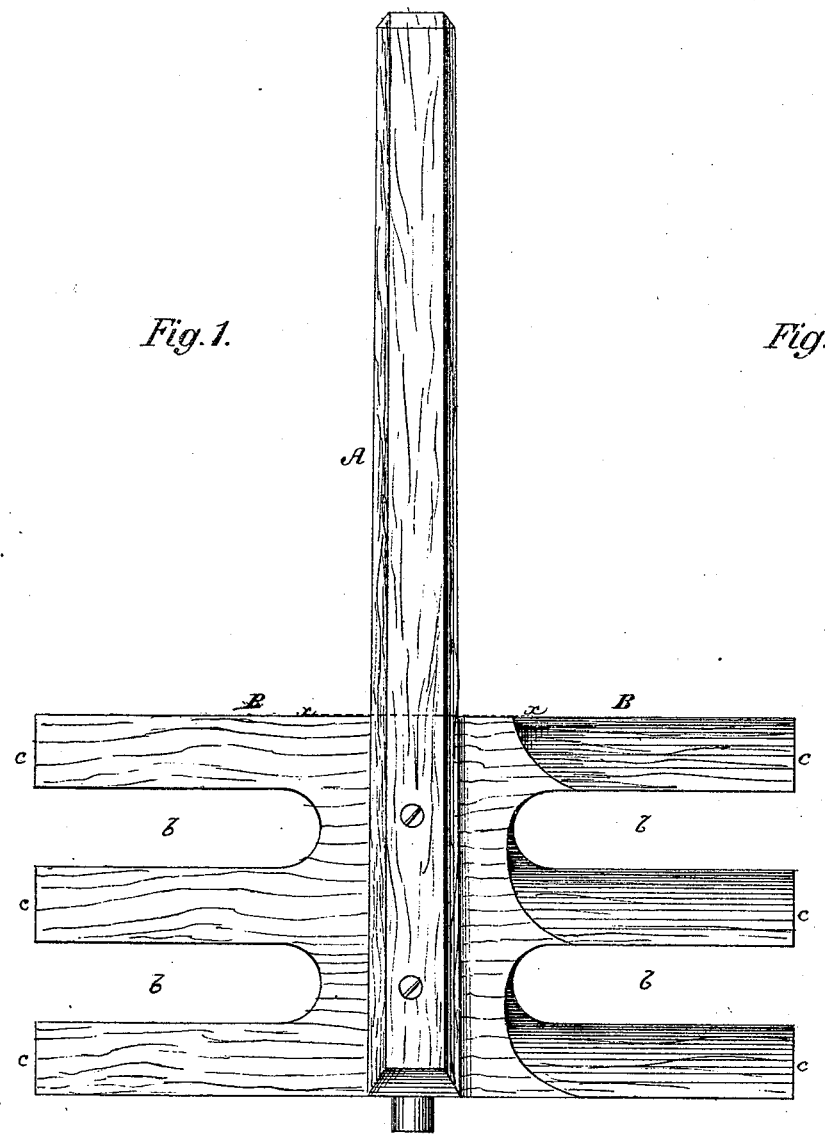
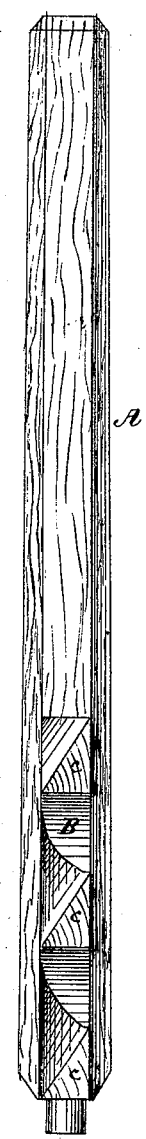
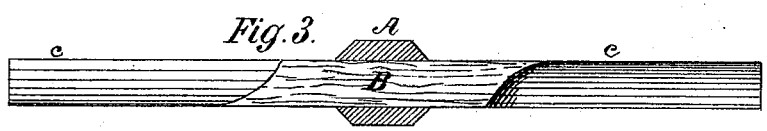
Witnesses:                                    Inventor:

UNITED STATES PATENT OFFICE.

HARVEY L. WELLS, OF CHILLICOTHE, MISSOURI.

IMPROVEMENT IN CHURN-DASHERS.

Specification forming part of Letters Patent No. 114,736, dated May 9, 1871.

*To all whom it may concern:*

Be it known that I, HARVEY L. WELLS, of Chillicothe, county of Livingston, and State of Missouri, have invented an Improvement in Dashers for Churns, of which the following is a clear, full, and exact description, reference being had to the accompanying drawing, making a part of this specification, in which—

Figure 1 is a front view of my improved dasher. Fig. 2 is a vertical side view. Fig. 3 is a horizontal sectional view through the line $x\ x$.

The object of my invention is to create a current of cool air in the body of milk or cream during the process of churning; and it consists in combining a broad paddle, which will produce a partial vacuum near the shaft, with fingers of a peculiar shape, to continuously throw the milk or cream into the vacuum, where it becomes mixed with the cool air, and thus secures not only a rapid collection of the butter, but secures a better article in both flavor and color, and hence butter of a higher value in the market.

To enable others skilled in the art to understand and use my invention, I will proceed to state how I have carried it out.

In the drawing, A represents a vertical shaft, having suitable bearings, and operated by any suitable mechanism. To the lower part of this shaft is the paddle B B, which is secured thereto by pins or screws. This paddle has a solid flat surface for about one-third of the projecting length on each side of the shaft A. It is then bifurcated or separated into two or more forks or fingers the rest of the distance, as shown in Fig. 1. These fingers $c\ c$ are formed at equal distances from each other, the space $b$ between each being a little wider than the width of the fingers.

The width of each of the fingers should be double the thickness of the paddle and be beveled, as shown in Fig. 1, the fingers on the opposite ends of the paddle being beveled on the opposite sides, so as to throw the inclined sides of each set of fingers forward against the milk or cream as the paddle revolves with the vertical shaft.

It is evident from this description of my invention that when the paddle B B is revolving, a partial vacuum is produced near the lower part of the vertical shaft A, and a current of cold air passes down to fill it, while the peculiarly-shaped fingers $c\ c$ will throw the milk or cream upward and backward into this vacuum, and cause it to mix with the current of cool air. This not only facilitates the process of making the butter, but it secures a better flavor and color.

Having thus described my invention, what I claim as new, and desire to secure by Letters Patent, is—

A churn-dasher of the configuration described, consisting of the vertical shaft A and central paddle portion, B, carrying the triple fingers $c\ c\ c$, beveled as shown, and for the purpose specified.

HARVEY L. WELLS.

Witnesses:
   J. C. LATSBURGH,
   JOHN SMITH.